(12) United States Patent
Rajagopalan et al.

(10) Patent No.: US 10,641,220 B2
(45) Date of Patent: May 5, 2020

(54) FUEL FILTER

(71) Applicant: J. C. Bamford Excavators Limited, Uttoxeter, Staffordshire (GB)

(72) Inventors: Anathan Rajagopalan, Maharashtra (IN); Atul Malode, Maharashtra (IN); Prashant Chavan, Maharashtra (IN); Mohammad Saifullah Khan, Maharashtra (IN); Chris Ward, Uttoxeter (GB); Sanjeev Arora, Maharashtra (IN)

(73) Assignee: J. C. Bamford Excavators Limited, Uttoxeter, Staffordshire (GB)

( * ) Notice: Subject to any disclaimer, the term of this patent is extended or adjusted under 35 U.S.C. 154(b) by 67 days.

(21) Appl. No.: 15/875,946

(22) Filed: Jan. 19, 2018

(65) Prior Publication Data

US 2018/0209387 A1 Jul. 26, 2018

(30) Foreign Application Priority Data

Jan. 20, 2017 (GB) .................................... 1701029.9

(51) Int. Cl.
*F02M 37/24* (2019.01)
*B01D 36/00* (2006.01)
(Continued)

(52) U.S. Cl.
CPC ............. *F02M 37/24* (2019.01); *B01D 35/16* (2013.01); *B01D 36/005* (2013.01);
(Continued)

(58) Field of Classification Search
CPC .. B01D 36/005; B01D 36/06; B01D 2210/64; B01D 23/74; F02M 37/24; F02M 37/26; F02M 37/28; G01F 23/30–76
See application file for complete search history.

(56) References Cited

U.S. PATENT DOCUMENTS 3,868,321 A * 2/1975 Gough ............... B01D 17/0214
210/86
6,645,372 B2 * 11/2003 Girondi ................ B01D 36/005
210/85
(Continued)

FOREIGN PATENT DOCUMENTS

EP 1287252 A1 3/2003
FR 2533667 A1 3/1984
(Continued)

OTHER PUBLICATIONS

Search Report for GB 1701029.9, dated Jun. 7, 2017.
Extended European Search Report for European Patent Application No. 18151032.2, dated Feb. 28, 2018.

*Primary Examiner* — Terry K Cecil
(74) *Attorney, Agent, or Firm* — Marshall, Gerstein & Borun LLP

(57) ABSTRACT

A fluid drain off system for a fuel filter, the system comprising a float, movable together with a trigger device for a switch, such as a magnet, in response to the level of fluid contaminant, a switch arranged to be selectively triggered by the trigger device upon the fluid contaminant reaching a predetermined level, and a fluid passage configured to be selectively opened in response to the triggering of the switch to allow fluid contaminants to be drained from the filter.

21 Claims, 4 Drawing Sheets

(51) Int. Cl.
 F02M 37/28 (2019.01)
 B01D 35/16 (2006.01)
 G01F 23/74 (2006.01)
(52) U.S. Cl.
 CPC ........... B01D 36/006 (2013.01); F02M 37/28 (2019.01); *B01D 2201/64* (2013.01); *G01F 23/74* (2013.01)

(56) References Cited

U.S. PATENT DOCUMENTS

| | | |
|---|---|---|
| 6,783,665 B1 | 8/2004 | Girondi |
| 2008/0110812 A1 | 5/2008 | Jensen et al. |
| 2008/0150552 A1 | 6/2008 | Straub |
| 2014/0365101 A1 | 12/2014 | Itoga et al. |

FOREIGN PATENT DOCUMENTS

| | | | | |
|---|---|---|---|---|
| GB | 1408291 A | | 10/1975 | |
| GB | 2047108 A | * | 11/1980 | ......... B01D 17/0214 |
| GB | 1600271 A | | 10/1981 | |
| GB | 2097927 A | | 11/1982 | |
| JP | S5738656 A | | 3/1982 | |
| KR | 20020038973 A | | 5/2002 | |
| KR | 100349638 B1 | | 8/2002 | |

* cited by examiner

FUEL FILTER

FIELD OF THE INVENTION

The present invention relates to a fuel filter and particularly to a drain off system to drain contaminants from a filter automatically, or at least with reduced user intervention.

BACKGROUND OF THE INVENTION

Fuel used in an engine such as a diesel or petrol (gasoline) powered internal combustion (IC) engine may contain contaminants such as water or any other non-fuel fluid. Water present in the fuel tends to damage the fuel injection system and in extreme circumstances may lead to subsequent engine failure. Further, the engine efficiency may be reduced if the engine system works improperly due to such contamination. To solve the abovementioned problem, a fuel filter is used to separate fuel impurities and water particles prior to combustion.

Conventional fuel filters contain single or multiple filter media in order capture particulate matter. In addition water, by virtue of its higher density than petrol or diesel, tends to accumulate in the bottom of the filter housing.

The accumulated water should be drained off as soon it reaches to maximum level. If accumulated water surpasses the maximum level, it flows with the fuel inlet flow to the high pressure fuel system and affects the operation of the engine as described above, and may also damage the filter media.

In a conventional IC engine (such as those found in vehicles such as construction or agricultural machines, as well as in engines of electrical generators) manual drain off system is provided at the lower part of fuel filter to drain the accumulated water. In such a system the operator has to consistently monitor the water level and manually drain off water. In many instances, operators are not suitably trained, or simply forget to drain off water leading to the problems set out above.

It is known to provide an indication system remotely from the filter such as on a dashboard located in the operator cab. The indication system indicates the operator when water level reaches to the said maximum limit and further instructs the operator to drain off water.

KR20010019911 proposes a fuel filter provided with auto drain apparatus having an internal guided magnet mounted float located in the closed chamber. However, the above-mentioned solution has some drawbacks. First, the magnet is mounted on the float hence it is exposed to the fuel contaminants which may result in damage to the magnet. Second, the weight is adjusted by a screw placed on the float, which may increase the possibility of permanent water penetration into the float. Third, the arrangement may be prone to clogging by the impurities. Finally, the float is solid and free to move in the closed chamber hence the operator may misled due to free movement of the float during tilting or inclination of the vehicle in which the engine is fitted as the float may falsely trigger the magnet detection sensor.

Another proposal is mentioned in patent publication no. U.S. Pat. No. 6,783,665. In this disclosure, there is a small clearance between the float and guiding means hence the float is prone to sticking in the chamber due to the build-up of fuel impurities. Second, although the system is automatic the operator intervention is still required for draining off water.

The present invention seeks to overcome, or at least mitigate some of the problems discussed above.

SUMMARY OF THE INVENTION

One aspect of the present invention provides a fluid drain off system for a fuel filter, the system comprising a float, movable together with a trigger device for a switch, such as a magnet, in response to the level of fluid contaminant, a switch arranged to be selectively triggered by the trigger device upon the fluid contaminant reaching a predetermined level, and a fluid passage configured to be selectively opened in response to the triggering of the switch to allow fluid contaminants to be drained from the filter. Advantageously this provides for fluid contaminants to be drained from a fuel filter with reduced or no operator intervention, thereby reducing the risk of drainage being neglected, and damage being caused to an associated engine.

The system may further comprise a baffle, and wherein the float may comprise a portion radially spaced from an axial center of the housing in use, wherein the baffle may comprise a guide radially spaced from an axial center of the housing to guide the corresponding portion of the float, and wherein the trigger device may be arranged substantially at the axial center of the housing in use. Advantageously this provides for a more reliable sensing of when the contaminant has reached the predetermined level, even if the associated fuel filter is tilted from a vertical orientation.

The baffle may comprise a stop for preventing or inhibiting the movement of the float past a predetermined position. Advantageously, providing a stop prevents the float from becoming misaligned with the baffle, moving beyond the location of the sensor and providing a false read-out or fouling on filter media in the filter.

The baffle may comprise a plurality of guides, preferably three guides, spaced angularly with respect to the axial center. Advantageously this provides for reliable guidance in a wide range of filter orientations.

The baffle may comprise a plurality of stops, optionally three stops, spaced angularly with respect to the axial center.

A radially outer surface of the guide may guide the float, optionally wherein a radial clearance is provided between the guide and the float. Advantageously this arrangement further enhances the guidance of the float, especially if there is a build-up of contaminants on the float and/or baffle.

The baffle may comprise a base arranged to seat on an inner base surface of the filter. Advantageously, this enables the baffle to be easily and securely mounted within a fuel filter.

A portion of the baffle may be configured for frictional, form-fitting or interference engagement with a corresponding surface of the filter such that the baffle may be retained in a desired position with respect to the baffle. Advantageously this enables the baffle to be mounted within a fuel filter without requiring fasteners, adhesive or other additional securing means.

The switch may be arranged for insertion into an aperture on a base of the filter from the underside thereof and may be secured to the filter with respect to the underside of the base. Advantageously this provides for simple assembly of the switch to a fuel filter.

The fluid passage may be arranged for mounting on a base of the filter at least partially selectively closing an aperture in the base of the filter. Advantageously this provides for simple assembly of the fluid passage to a fuel filter.

The switch and the fluid passage may be mounted together as part of the same subassembly. Advantageously this further simplifies assembly.

The switch and fluid passage may have a common housing. Advantageously this may simply manufacture of the system.

The fluid passage may be selectively closable by use of a solenoid valve. Advantageously a solenoid valve provides a reliable way of controlling fluid flow through the fluid passage.

The float may be shaped such that when in its lowermost position it is configured to close the fluid passage. Advantageously this arrangement provides a safeguard against fuel being erroneously expelled via the fluid passage.

The system may further comprise a controller, the controller being configured to open the fluid passage for a predetermined period, upon the trigger device triggering the switch. Advantageously this provides a convenient way of controlling the expelling of fluid contaminants.

The system further comprises a controller, the controller being configured to only open the fluid passage upon receipt of a signal indicating that a vehicle to which the system is fitted is stationary. Advantageously this ensures that the fluid is in a steady state whilst the fluid contaminants are expelled such that the correct amount of drainage may occur.

The system may further comprise an audio/visual indicator to indicate to an operator of a vehicle to which the system is fitted that fluid contaminant has reached the predetermined level, so as to prompt the user to bring the vehicle to a halt.

The switch may be either Namur sensor, reed switch, proximity sensor, electromagnetic sensor, hall effect sensor or combination of thereof.

The shape of the float may be either of circular, square, triangle, rectangular, round, ring, hexagonal or any other geometric shape or combination of thereof having at least one spoke connected interior or exterior of the float which restrict movement or misalignment of the float over the baffles due to tilting of the filter in use.

The trigger device may be substantially sealed from fluid ingress within the float. Advantageously, this may extend the life of the trigger, by preventing it by being damaged due to contact with the fluid contaminants.

A second aspect of the present invention provides a fuel filter incorporating a fluid drain-off system according the first aspect.

A third aspect of the present invention provides an IC engine incorporating a fluid drain-off system according to the first aspect.

A fourth aspect of the present invention provides a vehicle, such as a working machine, or an electric generator incorporating a fluid drain-off system according to the first aspect.

BRIEF DESCRIPTION OF THE DRAWINGS

An embodiment of the present invention is now disclosed by way of example only, with reference to the accompanying draughts, in which.

DETAILED DESCRIPTION OF THE INVENTION

Figure 1:
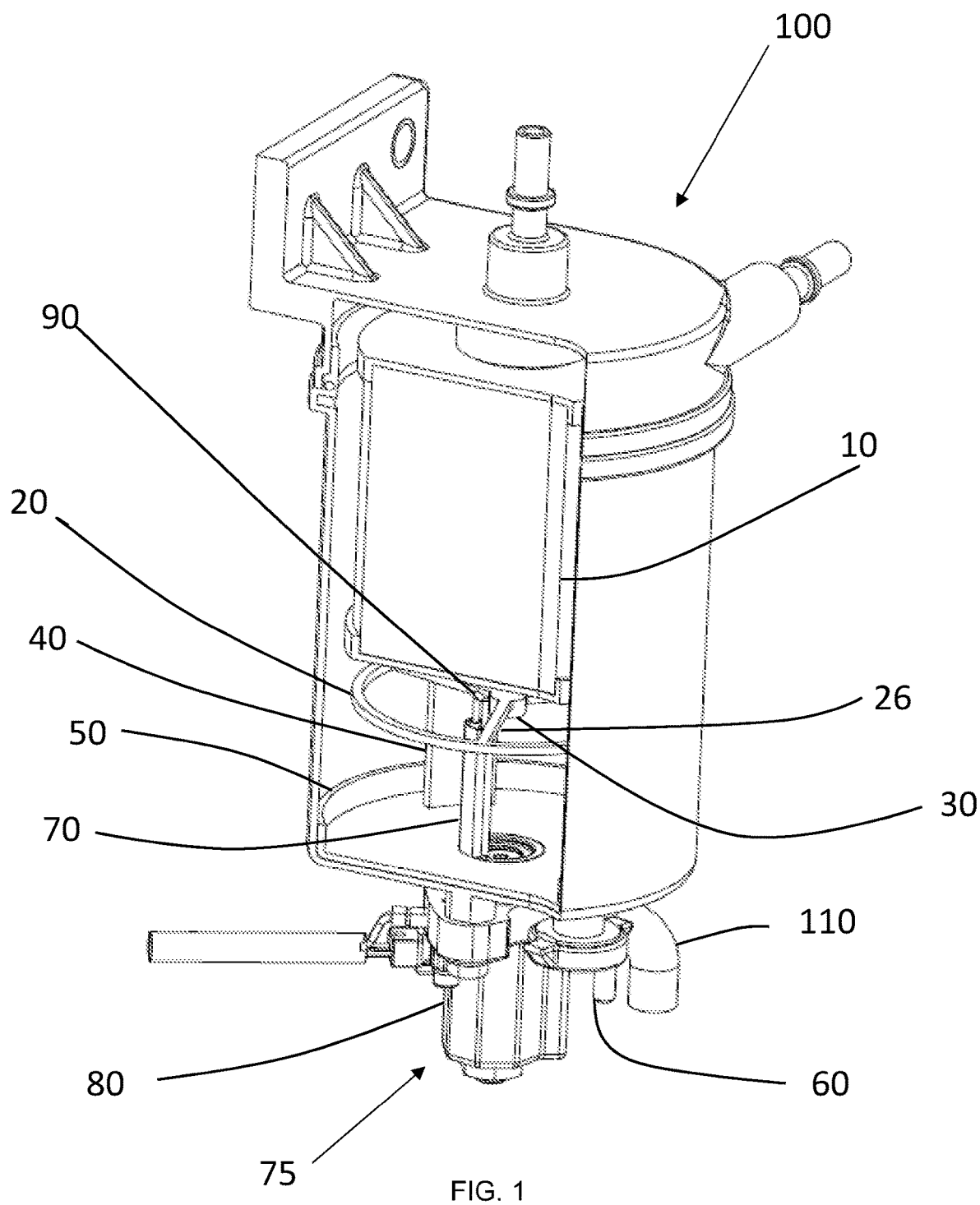
FIG. 1 is a cross-sectional view of a fuel filter according an embodiment of the present invention.
Figure 2:
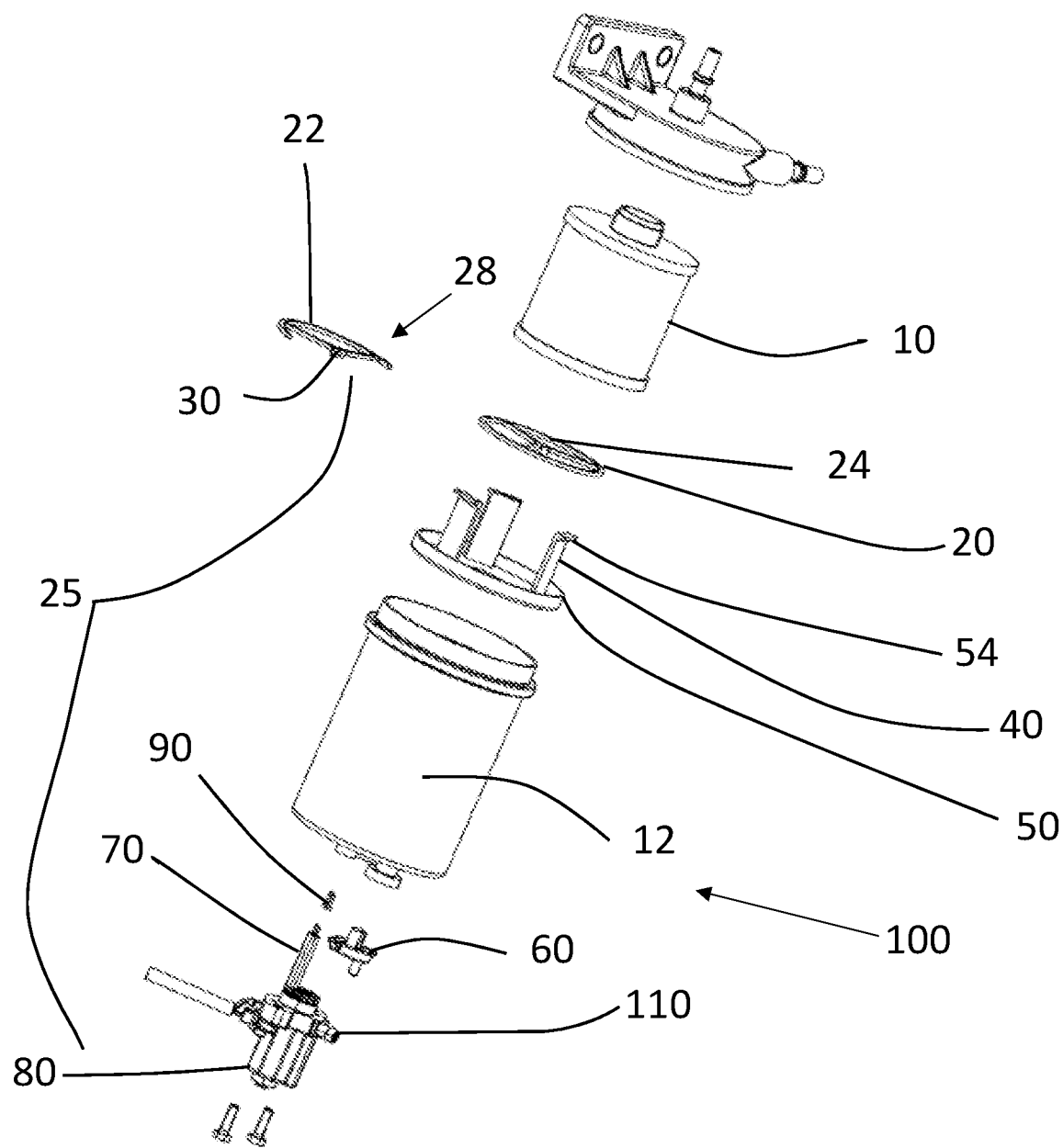
FIG. 2 is an exploded view of the fuel filter of FIG. 1.

A fuel filter and a drain off system to separate and drain contaminants from a fuel filter according to an embodiment of the present invention are described below with reference to accompanying drawings FIGS. 1 to 4.

The fuel filter 100 consists of a filter media 10 located inside a fuel filter housing 12 generally towards the top thereof, a baffle 40 located inside the fuel filter housing and generally towards the bottom thereof a float 20 incorporating a magnet 30, a switch 90, a protecting cover or stem 70 for the switch 90, a solenoid valve 80 and a faucet 110 for automatic drain water and, in this embodiment, a faucet 60 for manual drain water. The baffle 40, switch 90, solenoid valve 80 and faucet 110, collectively form a drainage assembly 25. The said switch 90 may, for example, be a Namur sensor, reed switch, proximity sensor, electromagnetic sensor, hall effect sensor or combination of thereof.

In this embodiment, the baffle 40 includes a base 50 that is generally circular and is intended to conform to the internal diameter of the base of the housing so is pressed into location and retained as a press-fit or interference fit. In other embodiments alternate retaining arrangements may be employed however, such as fasteners or adhesives. Three retainer legs 52 extend upwardly generally parallel to the side wall of the housing 12 and terminate at their upper ends with radially outwardly extending stops 54. The retainer legs have a degree of flex to enable the fitting of the float over the stops. The baffle 40 defines two regions inside the fuel filter housing 12, the upper compartment consisting of the filter media 10 whereas the bottom compartment consisting of the drainage assembly 25.

The float 20 is dimensioned so as to be externally guided on the baffles 40 and is able to move vertically in an unimpeded manner between the base 50 of the baffle 40 and the stops 54. The specific gravity of the float 20 along with the magnet 30 incorporated therein, is less than the specific gravity of water but more than the specific gravity of the fuel used in the particular engine. In this embodiment the float 20 has a generally circular arm 22 connected to a central hub 24 by is multiple spokes 26. However the float 20 may be of any suitable geometrical shape and the shape of the float 20 that does not restrict the performance of the present invention. The float 20 is dimensioned with such a clearance that the float 20 can move vertically with respect to the baffles 40 even if there is a degree of contaminant build-up on the retainer legs 52 and the rim 22.

The magnet 30 is incorporated inside the float 20 at the radially central hub 24 location of the float 20. The magnet 30 placed inside the float 20 in a manner that it is sealed from the fluid inside the filter 100 (e.g. by being overmolded). The magnet 30, being protected inside the float 20, may increase working efficiency of the magnet, life span of the magnet and furthermore saved from external damage. The spokes provided on the float 20 also helps in regulating movement of the float 20 and the magnet 30 incorporated inside it.

The filter housing 12 has a central aperture in its bottom wall. A combined assembly 75 that incorporates the switch 90, stem 70, solenoid valve 80, and faucet 110 is mounted to an underside of the bottom wall such that the stem 70 projects up through the aperture and the switch is positioned in general vertical alignment with the magnet 30 when in its uppermost position restrained by the stops. The stem 70 is offset from a central axis of the housing so as to be adjacent to the hub 24 but not impede motion of the float 20.

The switch 90 is protected by the protective cover or stem 70. In this embodiment the assembly 75 is secured via threaded fasteners to the bottom wall and an O-ring type seal inhibits leakage.

A fluid passage 82 extends through the assembly 75 from the base wall of the housing to the faucet 110 and is selectively closed by the solenoid valve 80. The solenoid valve 80 is normally closed, and only permits fluid to flow through the passage when energized. An additional faucet 60 is optionally provided at the base of the fuel filter housing 50 to manually drain of water if required.

Figure 3:
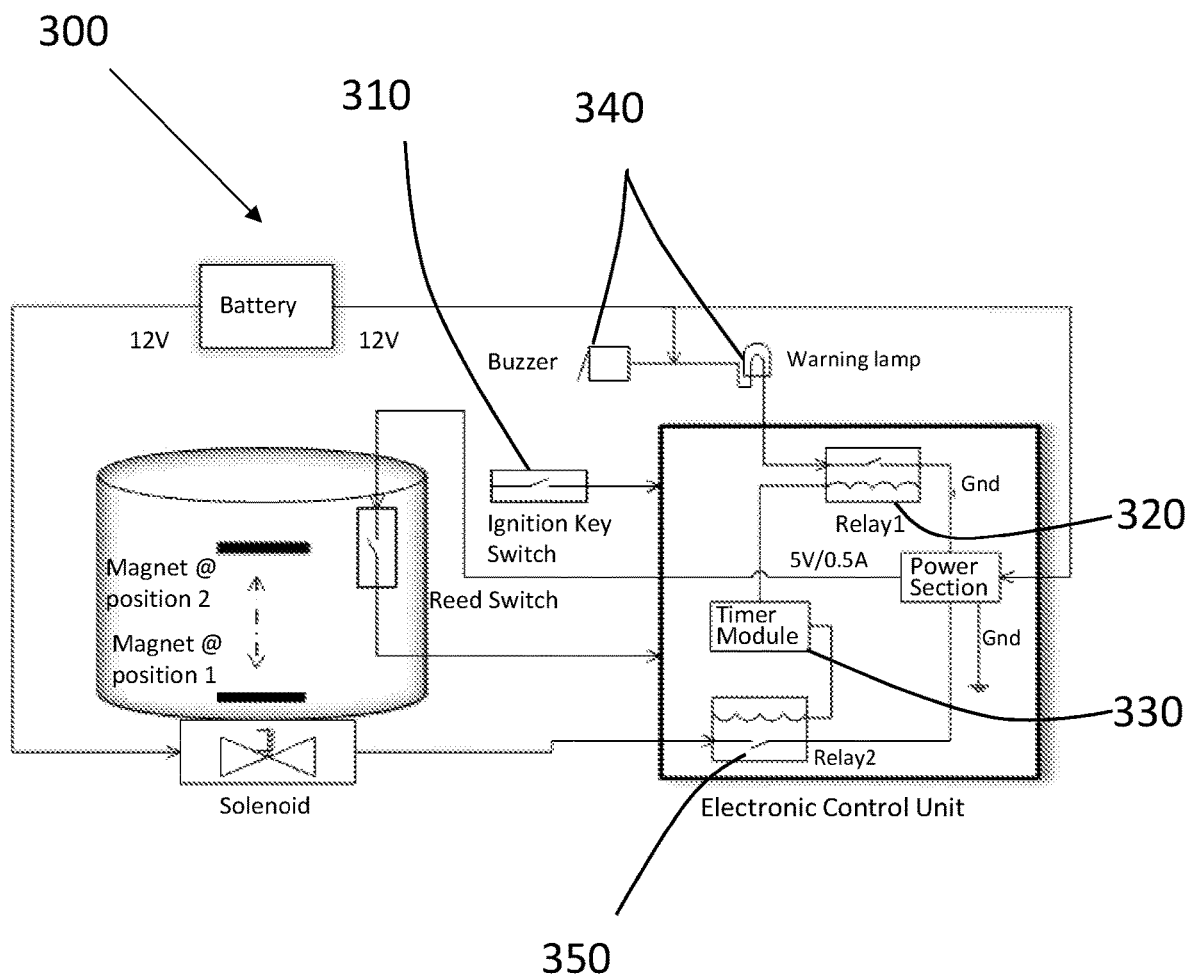
FIG. 3 is a schematic representation of a drain off system incorporating the fuel filter of FIG. 1.

Referring to FIG. 3, in one embodiment of the present invention, the automatic water drain off system has electrical system 300 which is connected to the switch 90 and the solenoid valve 80. The electrical system optionally comprises an audio or visual indication means 340, a timer module 330 and a relay switch 320 and second relay switch 350.

Figure 4:
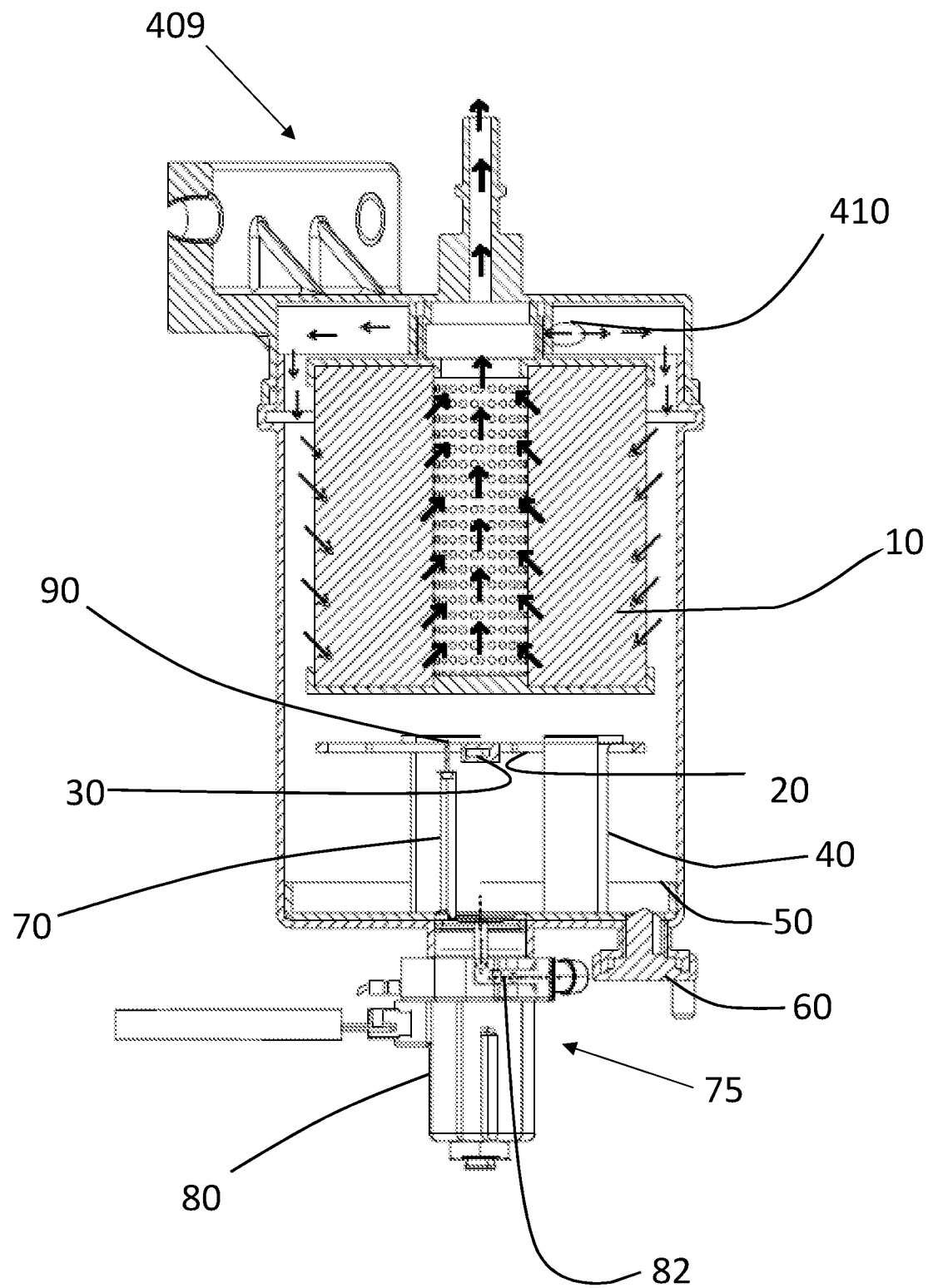
FIG. 4 is a view of the fuel filter in use.

Referring to FIG. 4, operation of the drain off system 400 is as follows. At the initial condition with no water contamination the float 20 rests on the base of the housing 50 as its specific gravity is less than the fuel. As the engine operates, fuel enters the fuel filter 100 from input port 410. The fuel is filtered through the filter media 10 and water or other fluid present in the fuel accumulates in the lower region of the housing 50. As the level of the accumulated water increases, the float 20 also rises. The float 20 floats on the water surface because of specific gravity of the float along with the magnet 30 is less than the specific gravity of water.

Once the water reaches approximately the same level as the stops 54 the magnet has risen to the level of the switch 90 and triggers the switch.

The switch 90 activates the solenoid valve 80 to open the passage 82 and allows water under gravity to drain from the faucet 110.

Referring to FIGS. 1, 2, 3 & 4; in one embodiment the automatic water drain off system has an electrical system 300 which is connected to the switch 90. When the engine is operating or the ignition switch is on and when electromagnetic connection is formed between the magnet 30 and the switch 90, then the circuit further energizes an audio-visual type indicator 340 through relay switch 320. Activation of the audio-visual type indicator 340 indicates to the operator that the accumulated water has reached the upper limit and hence needs to drain it. This may act as a prompt for the operator to bring the vehicle to a halt before draining commences automatically as described above. Alternatively, a manual activation of a second relay switch 350, energizes a timer module of the electrical system 300 which activates the solenoid valve 80 for the pre-determined time to drain water (determined by how long is required for water to drain substantially from the housing from its maximum level).

When the engine is not operating but the ignition is on and when electro-magnetic connection is formed between the magnet 30 and the switch 90, then the switch 90 signals the relay switch 350. This automatically activates the relay switch 350 and further transfer signals to the timer module 330 which activates the solenoid valve 80 for the pre-determined time to drain water.

In another embodiment of the present invention, the timer module 330 may be activated from the relay switch 350 provided in the said electrical system of the drainage system. Based on the audio-visual type indication 340 of the integrated auto drainage system, the operator may activate the relay switch 350 which further activates the timer module 330. The timer module 330 further activates the solenoid valve 80 for the pre-determined time to drain water from the fuel filter housing.

In another embodiment, when the operator switches on the vehicle with the vehicle key 310 and at the same time the audio-visual indicator 340 is also in indication mode then the operator may switch on the relay switch 350 which further activates the solenoid valve 80 for certain pre-determined time and hence all the accumulated water may drain out from the fuel filter housing during this operation.

In another embodiment of the present invention, as the accumulated water level goes down due to the activation of the solenoid valve 80 for the pre-determined time, the float 20 also goes down along with water level. When all the accumulated water drains out from the fuel filter housing thereafter the float 20 rests on the base of the housing 50. During this condition, the float 20 rests on the base of the housing 50 in such manner that it closes the fluid passage 82 or manual faucet 60 or both. Hence although the timer module 330 and the relay switch 350 activate the solenoid valve 80 for the pre-determined time but if all the accumulated water drains out from the fuel filter housing prior to the pre-determined time or prior to deactivation of the solenoid valve 80, thereafter the float 20 closes the faucet 110 or manual faucet 60 or both. This ensures no wastage of fuel and prevents fuel escaping into the environment.

In a further alternative embodiment a second switch may be provided proximate to the base of the housing so such that when the water has fully drained, closure of the valve is automatically triggered.

It will be appreciated that, as described above, the drain off system may be incorporated within an existing fuel filter present in a vehicle with little or no adaptation because the baffle 40 and float 20 may be push-fitted in a simple operation from above and the assembly may be secured by fasteners or other securement from below. Alternatively the housing may instead be adapted to internally include stops. Further, the housing may integrally incorporate the fluid passage and other components of the assembly 75.

In other embodiments the solenoid valve may be replaced by a pump or other suitable valve arrangement.

The abovementioned description describes the exemplary embodiments of the present invention. One skilled in the art will easily understand from the description and from the accompanying drawings and claims that various changes, modifications and variations can be made therein without changing scope of the invention as defined by the following claims.

The invention claimed is:

1. A fluid drain off system for a fuel filter, the fluid drain off system comprising:
    a trigger device for a switch, the trigger device arranged at a substantially central axis of a housing of the fluid drain off system;
    a float, movable together with the trigger device in response to a level of fluid contaminant, wherein the float comprises a portion radially spaced from an axial center of the housing;
    the switch arranged to be selectively triggered by the trigger device upon fluid contaminant reaching a pre-determined level;
    a fluid passage configured to be selectively opened in response to the triggering of the switch to allow fluid contaminants to be drained from the fuel filter; and a baffle comprising a guide radially spaced from the axial center of the housing to guide a portion of the float radially spaced from the axial center of the housing; and wherein a radially outer surface of the guide guides the float.

2. The fluid drain off system according to claim 1 wherein the baffle comprises a stop for preventing or inhibiting the movement of the float past a predetermined position.

3. The fluid drain off system according to claim 2 wherein the baffle comprises a plurality of stops, spaced angularly with respect to the axial center.

4. The A fluid drain off system according to claim 1 wherein the baffle comprises a plurality of guides, spaced angularly with respect to the axial center.

5. The fluid drain off system according to claim 1 wherein a radial clearance is provided between the guide and the float.

6. The fluid drain off system according to claim 1 wherein the baffle comprises a base arranged to seat on an inner base surface of the filter.

7. The fluid drain off system according to claim 1 wherein a portion of the baffle is configured for frictional, form-fitting or interference engagement with a corresponding surface of the filter such that the baffle may be retained in a desired position with respect to the housing.

8. The fluid drain off system according claim 1 wherein the switch is arranged for insertion into an aperture on a base of the filter from the underside thereof and secured to the filter with respect to the underside of the base.

9. The fluid drain off system according to claim 1 wherein the fluid passage is arranged for mounting on a base of the filter at least partially selectively closing an aperture in the base of the filter.

10. The fluid drain off system according to claim 9 wherein the switch and fluid passage have a common housing.

11. The fluid drain off system according to claim 1, wherein the fluid passage is selectively closable by a solenoid valve.

12. The fluid drain off system according to claim 1 wherein the float is shaped such that when in its lowermost position it is configured to close the fluid passage.

13. The fluid drain off system according to claim 1 wherein the system further comprises a controller, the controller being configured to only open the fluid passage upon receipt of a signal indicating that a vehicle to which the system is fitted is stationary.

14. The fluid drain off system according to claim 13 further comprising an audio/visual indicator to indicate to an operator of a vehicle to which the system is fitted that fluid contaminant has reached the predetermined level, so as to prompt the user to bring the vehicle to a halt.

15. The fluid drain off system according to claim 1, wherein shape of the float may be either of circular, square, triangle, rectangular, round, ring, hexagonal or any other geometric shape or combination thereof having at least one spoke connected interior or exterior of the float which restrict movement or misalignment of the float over the baffles due to tilting of the fuel filter.

16. The fluid drain off system according to claim 1 wherein the trigger device is substantially sealed from fluid ingress within the float.

17. The fuel filter incorporating a fluid drain-off system according to claim 1.

18. An IC engine incorporating a fluid drain-off system according to claim 1.

19. A vehicle or an electric generator incorporating a fluid drain-off system according to claim 1.

20. A fluid drain off system for a fuel filter, the fluid drain off system comprising:

a trigger device for a switch, the trigger device arranged adjacent a central axis of a housing of the fluid drain off system;

a float, the float movable together with the trigger device in response to a level of fluid contaminant, wherein the float comprises a portion radially spaced from an axial center of the housing;

a switch arranged to be selectively triggered by the trigger device upon the level of fluid contaminant reaching a predetermined level;

a fluid passage configured to be selectively opened in response to the triggering of the switch to allow fluid contaminants to be drained from the fuel filter; and a baffle comprising a guide radially spaced from the axial center of the housing to guide a portion of the float radially spaced from the axial center of the housing; and wherein the float is shaped to have at least one spoke operatively coupled to a central hub housing the trigger device.

21. The fluid drain off system of claim 20, wherein the hub is circular, square, triangular, rectangular, hexagonal or a combination thereof.

* * * * *